United States Patent
Angelo et al.

(10) Patent No.: US 7,472,283 B2
(45) Date of Patent: Dec. 30, 2008

(54) METHOD AND APPARATUS FOR SECURED DIGITAL VIDEO AND ACCESS TRACKING

(75) Inventors: Michael F. Angelo, Houston, TX (US); E. David Neufeld, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1418 days.

(21) Appl. No.: 10/158,359

(22) Filed: May 30, 2002

(65) Prior Publication Data
US 2003/0233556 A1    Dec. 18, 2003

(51) Int. Cl.
*H04L 9/00* (2006.01)
*H04K 1/00* (2006.01)
*G06F 7/04* (2006.01)
*G07C 9/00* (2006.01)
*G06K 9/00* (2006.01)

(52) U.S. Cl. ........................ 713/186; 713/176; 713/177; 713/179; 726/5

(58) Field of Classification Search ................. 713/186, 713/176, 177, 179; 726/5; 382/115
See application file for complete search history.

(56) References Cited

U.S. PATENT DOCUMENTS 6,553,494 B1 * 4/2003 Glass ......................... 713/186
2003/0200217 A1 * 10/2003 Ackerman ..................... 707/9
2004/0236694 A1 * 11/2004 Tattan et al. .................. 705/50

FOREIGN PATENT DOCUMENTS

WO    WO 2004055737 A1 *    7/2004

OTHER PUBLICATIONS

Randal Burns, Zachary Peterson, Giuseppe Ateniese, Stephen Bono, "Veriable Audit Trails for a Versioning File System", Nov. 2005, StorageSS '05: Proceedings of the 2005 ACM workshop on Storage security and survivability, pp.44-50.*
Bruce Schneier, *Applied Cryptography, Protocols, Algorithms, And Source Code In C*, Second Edition, Chapter 2, Protocol Building Blocks (pp. 21-46).
Bruce Schneier, *Applied Cryptography, Protocols, Algorithms, And Source Code In C*, Second Edition, Chapter 19, Public-Key Algorithms (pp. 461-482).
Kenneth H. Rosen, *Elementary Number Theory and Its Applications*, Second Edition, Chapter 7.4, Public-Key Cryptography (pp. 230-237).
*What is cryptography?* [online]. Retrieved from the Internet:<URL: http://www.rsa.com/rsalabs/faq/html/1-2.html (2 p.).

(Continued)

*Primary Examiner*—Emmanuel L Moise
*Assistant Examiner*—Courtney D Fields

(57) ABSTRACT

The specification discloses a system and related method for tracking access to digital information that involves combining biometric information of a person seeking access with the digital information and a digital signature. Each person who accesses the digital information has their biometric and digital signatures combined in this manner. Thus, the digital information itself reflects who has accessed the information. Where the digital information is a video, the combining of the biometric and digital signatures is done on a frame-by-frame basis.

54 Claims, 2 Drawing Sheets

OTHER PUBLICATIONS

*What is public-key cryptography?* [online]. Retrieved from the Internet:<URL: http://www.rsa.com/rsalabs/faq/html/2-1-1.html (2 p.).

*What is digital signature and what is authentication?* [online]. Retrieved from the Internet:<URL: http://www.rsa.com/rsalabs/faq/html/2-2-2.html (2 p.).

*What is digital timestamping?* [online]. Retrieved from the Internet:<URL: http://www.rsa.com/rsalabs/faq/html/7-11.html (3 p.).

*What is are some of the more popular techniques in cryptography?* [online]. Retrieved from the Internet:<URL: http://www.rsa.com/rsalabs/faq/html/1-3.html (1 p.).

*What is the role of the United States government in cryptography?* [online]. Retrieved from the Internet:<URL: http://www.rsa.com/rsalabs/faq/html/1-6.html (2 p.).

*What is key management?* [online]. Retrieved from the Internet:<URL: http://www.rsa.com/rsalabs/faq/html/4-1-1.html (1 p.).

*What are certificates?* [online]. Retrieved from the Internet:<URL: http://www.rsa.com/rsalabs/faq/html/4-1-3-10.html (1 p.).

*What key size should be used?* [online]. Retrieved from the Internet:<URL: http://www.rsa.com/rsalabs/faq/html/4-1-2-1.html (2 p.).

\* cited by examiner

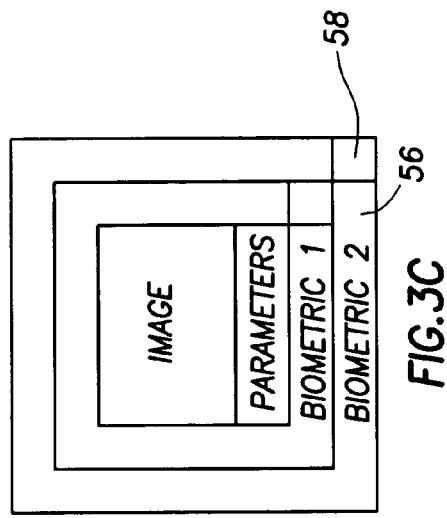
FIG.3B
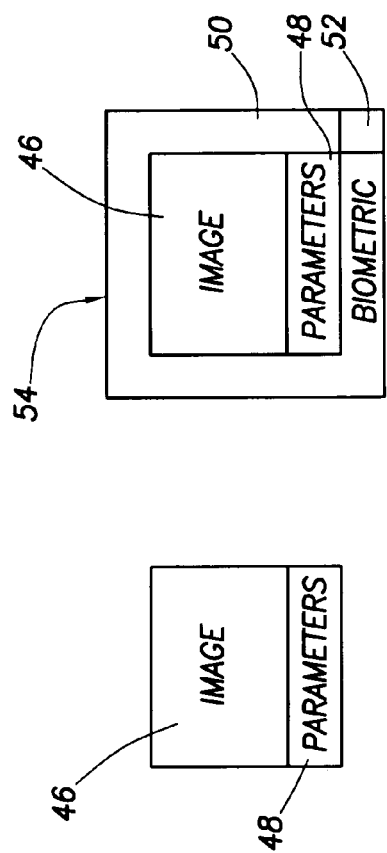
FIG.3C
FIG.3A
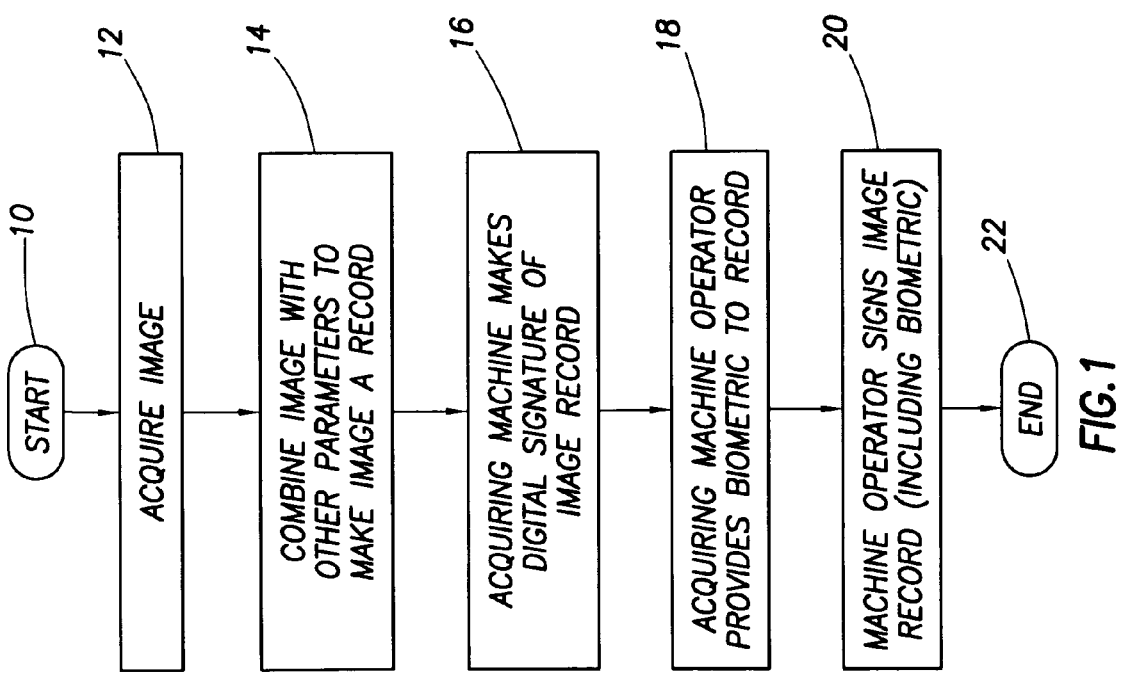
FIG.1

METHOD AND APPARATUS FOR SECURED DIGITAL VIDEO AND ACCESS TRACKING

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed to providing secure, non-repudiatable access to digital information. More particularly, the preferred embodiments are directed to providing access tracking for single frame and video images through the use of embedded biometric information in combination with public key enciphering techniques.

2. Background of the Invention

Society is growing more toward the use of digital information. As society becomes more reliant on digital information, it becomes increasingly important to be able to secure access to digital information, as well as track who has had access to the information. A specific example of such digital information is health care records regarding a particular patient. In the related art, access to health care information that is digitally maintained is typically controlled, and tracked, by the use of a user identification and password system. If a doctor wishes to, for example, review a patient's information, the doctor logs on to an informational source using his or her user identification and password. However, control over a user identification and password is easily lost, thus giving unscrupulous people the ability to obtain access to sensitive information, with relatively no way to track the access. Moreover, in the related art the user identification and password technique may only operate on a per-record basis. That is, the audit trails created by logging in using a user identification and password may only indicate that access to an entire file was granted, not that a user was granted access to any particular piece of information within that file, or to the extent the record was reviewed.

In the health care industry domain, new federal requirements, such as the Health Insurance Portability and Accountability Act (HIPAA), require access controls and audit trails with regard to the personal and sensitive health care information of an individual, and the controls required are greater than those offered in the related art techniques. The same type precautions mandated by HIPAA find application in other situations, such as tracking a "leak" of classified material. Further, being able to track, from individual to individual, access to a particular piece of digital information may find applicability in the copyright realm, especially with regard to illegal distribution of digitally stored music. The user identification and password paradigm simply does not provide the necessary access control and access tracking now required in many industries.

Thus, what is needed in the art is a way to provide secure, non-repudiatable access and tracking controls for digital information for digital files, single frame images, video images, and the like.

BRIEF DESCRIPTION OF SOME OF THE INVENTION

The problems noted above are solved in large part by a system and related method that utilizes the public key enciphering technology in combination with the use of biometric information to create a system for access control and tracking of digital information. More particularly, once the requester identity is sufficiently verified, the requestor's biometric information (such as a fingerprint, an iris scan, voice sample, DNA sample or any other physiological attribute which can uniquely identify the individual) is combined with the requested information. That is, the biometric information becomes part of the digital information requested—a combination image. The requester creates a digital signature based on the requestor's private key and the combination image by enciphering the hash of the combination image, and this signature too is incorporated into the overall image. The original image, the biometric data, and the requestor's signature, as a whole, are sent to the requestor.

If thereafter the requester leaks the information to an unauthorized person, by merely inspecting the leaked digital file it may be ascertained who was the last authorized recipient of the information. The digital signature may be verified by use of the requestor's public key, thus verifying that the original image, as well as the biometric data, exists in the file or files as when the digital signature was created. The biometric data, by definition, uniquely identifies the individual. Thus, the previous holder of the information cannot repudiate their request for access to the information because, even if the private key had been allegedly disclosed to the public, the biometric information could have only been provided by the requester. The addition of biometric information and digital signatures may continue indefinitely for each requestor to whom access is granted to implement access tracking with regard to the information.

In a second aspect, the access control and tracking is implemented with respect to streaming sources of digital information such as video or audio. In the video context, in the preferred embodiments the biometric information and digital signature are included within each image frame. In the audio context, the biometric information and digital signature is included within a segment of the audio file. The inclusion could be by merely appending the information to the end of the frame or segment, but preferably is by way of steganographic techniques, where the information is integrated within the image but otherwise hidden.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which:

FIG. 1 shows a flow diagram for creation of an image record of the preferred embodiment;

FIG. 3 shows, in a more graphical context, combining biometric information and digital signatures.

NOTATION AND NOMENCLATURE

Figure 2:
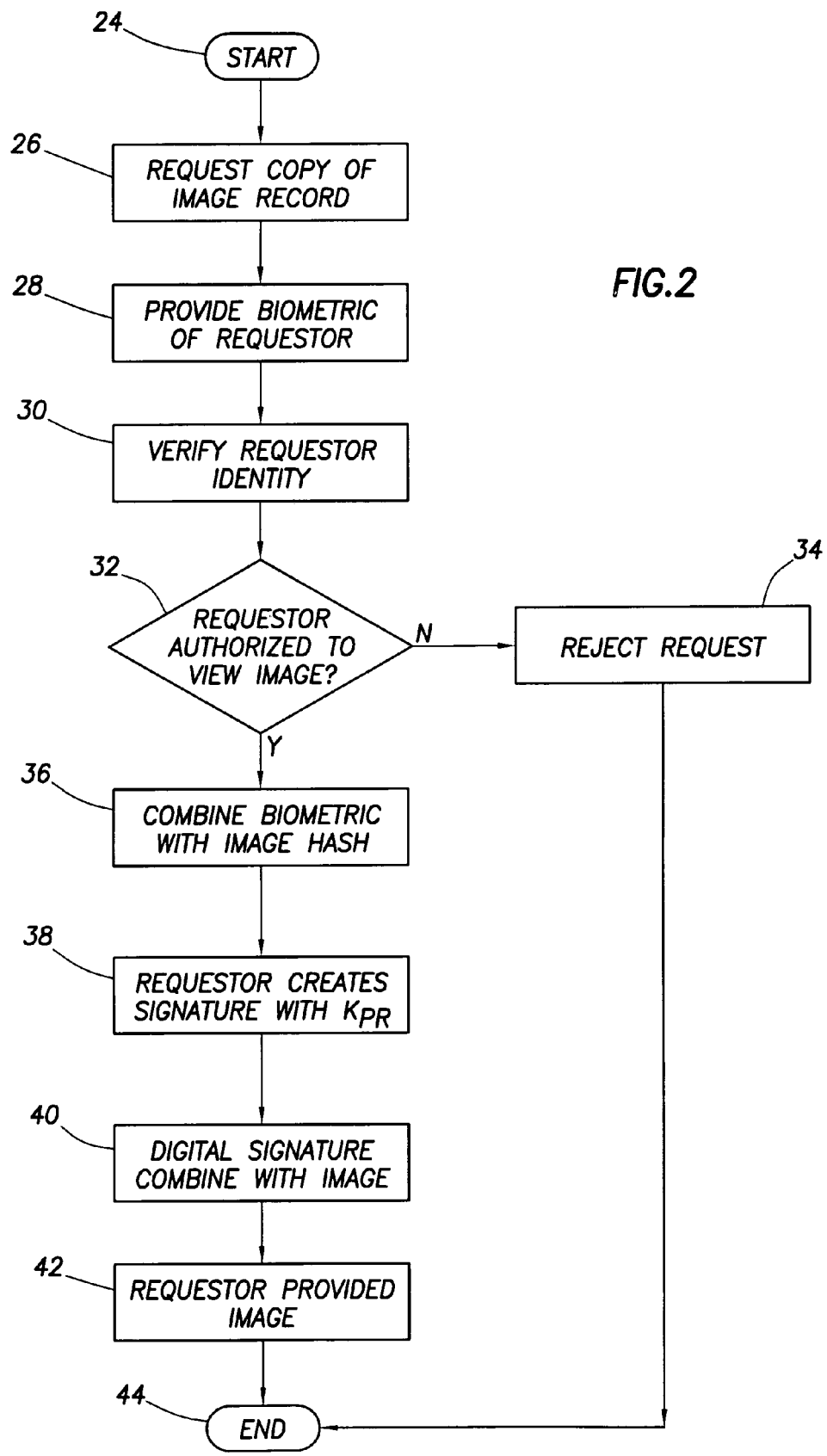
FIG. 2 shows a flow diagram for allowing access to the image record of the preferred embodiment.

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

Encipher—to disguise a message to hide the substance of the message. May also be known as encryption.

Decipher—turning an enciphered message into its original form. May also be known as decryption.

Biometric—information regarding a physical attribute that, to a great degree of certainty, uniquely identifies an individual, such as a fingerprint, an iris scan, a voice sample, a DNA sample or an indication of any other physiological attribute. A biometric may be an entire image, for example an image of a fingerprint; however, the term biometric may also comprise a minutiae which details only relevant features, such as inflection points in fingerprints or predominant line angles and lengths in an iris scan.

DETAILED DESCRIPTION OF THE PREFERRED EMBODIMENTS

The preferred embodiments of the present invention are directed to combining biometric information and digital signatures with digital information so that there exists record, within the digital information, of who has had access to the digital information. To fully describe the systems and related method, however, requires a brief digression to applications of one-way hash algorithms, public key/private key enciphering/deciphering techniques, and creation of digital signatures.

A hash function is a mathematical operation that takes a string of bits or bytes of variable length and converts the string into a fixed length where the value of the fixed length resultant is unique, to a great degree of certainty, for every possible pre-hash string. A one-way hash function is a hash operation that is very easy to compute from the original string to the hashed string, but very difficult to calculate in reverse. That is, taking the resultant of a one-way hash function, it is very difficult to determine the original string based solely on the resultant. Bruce Schneier's book titled "Applied Cryptography," Second Edition, Chapters 2 and 18, which are incorporated herein by reference as if reproduced in full below, detail one-way hash functions and their implementations. The resultants of the hash functions, which may also be referred to as cryptographic checksums, are similar to cyclic redundancy check (CRC) codes commonly used in data communications. While it may not be possible to recreate the original data from the checksum (whether CRC or cryptographic), it is possible to determine if the data received is the same as the data that was used in-hash function.

While hash functions may have many applications, for purposes of this specification a hash function is an integral part of creation of digital signatures. Digital signatures, as well as their application to the preferred embodiments, are discussed more fully below. For ease of description, a hash function will be represented mathematically as follows:

$$CC = H(X) \qquad (1)$$

where CC is the cryptographic checksum, H( ) represents the hash function and X is the data, whether a string of bytes, audio string or digital image, upon which the hash is calculated. Understanding how the hash function plays into the creation of a digital signature in the preferred embodiments, however, requires a discussion of public key enciphering techniques.

Public key enciphering technology is based on asymmetrical enciphering techniques. The most commonly known enciphering/deciphering techniques are symmetrical; that is, each user of an encrypted message knows the key that must be used to decipher the message. By contrast, public-key cryptography is asymmetrical in that there are two keys associated with each individual, one of which is held in secret or private, and the other of which is disclosed readily to the public. To send an enciphered message from a first person to a second person requires enciphering the message with the public key of the second person. The public key is not usable to decipher the message; however, the second person may decipher the message through the use of their private key. The public keys and private keys also work in reverse. If the second person creates a message and enciphers the message using their private key, only the second person's public key can be used to decipher the message. Since the public keys are by definition public, this second description provides little security for the enciphered message from the second person to the first, but plays an important role in the creation of digital signatures, which is discussed more fully below. Bruce Schneier's book titled "Applied Cryptography," Second Edition, Chapters 2 and 19, which are incorporated herein by reference as if reproduced in full below, discuss more fully the public-key cryptography techniques, as well as algorithms for implementing those techniques.

In slightly more mathematical treatment, the act of enciphering the message from the first user to the second user using the public key of the second user may be described as follows:

$$E = K_{public}(M) \qquad (2)$$

where E is the enciphered message, $K_{public}$ is the public key for the second person, and M is the message. The act of deciphering, by the second person, the enciphered message may be described more mathematically as follows:

$$D = K_{private}(K_{public}(M)) \qquad (3)$$

where D is the deciphered message and $K_{private}$ is the private key of the second person. Because by definition enciphering using the public key and deciphering using the private key provide the original message, in the case of equation (3), the deciphered message D is the same as M.

Based on the description of the public key enciphering technology, it appears that it would be possible, as a digital signature technique, to have a person wishing to "sign" a digital document to merely encipher the entire document with their private key. In this way, any other person could merely decipher the enciphered message with the public key of the second person, and compare the deciphered message to the original message to ascertain whether the contents were the same at the time of digital signing. While this is certainly possible, public-key enciphering technologies are generally one-thousand times slower than related symmetrical enciphering technologies. Because of the relative speed difference between the symmetrical and the asymmetrical enciphering technologies, the asymmetrical algorithms are typically used to encipher only smaller bits of information. Along these lines, creation of the digital signature in the preferred embodiments involves enciphering, using one's private key, the hash of the information which needs to be digitally signed.

Consider for purposes of explanation an original message M. The message M could be any digital file such as a set of bytes representing an ASCI character message, an image file in any format (e.g., JPEG, PDF, TIFF and the like), or could be streaming data such as audio or video. Assume that the original message M is simply a document that needs to be signed. If a person agrees with its contents, then a hash is performed on the file M, and the resultant of that hash is encrypted using the person's private key. Mathematically, the digital signature would be represented as follows:

$$S = K_{private}(H(M)) \quad (4)$$

where S is the signature. This digital signature then accompanies the original message M. If anyone wishes to verify that the signature is for the document M, they merely need to: 1) perform a hash operation on the document M; 2) decipher the signature using the public key of the signer; and 3) compare the results. Mathematically, verifying the signature may be represented by the following equations:

$$K_{public}(S) \stackrel{?}{=} H(M) \quad (5)$$

$$K_{public}(K_{private}(H(M'))) \stackrel{?}{=} H(M) \quad (6)$$

$$H(M') \stackrel{?}{=} H(M) \quad (7)$$

$$M' \stackrel{?}{=} M \quad (8)$$

where M' was the message used to create the hash for the digital signature, and M is the message to be verified. If the hash of M' does not exactly equal the hash of M, then the digital signature is not applicable to the message M under consideration.

In order to explain the preferred embodiments, and not as a limitation of the invention, the following discussion is directed to application of the preferred embodiments to a single image digital file, such as an electronically stored x-ray or the electronic version of a document. Streaming sources such as video are discussed more fully below.

FIG. 1 shows a flow diagram for creation of an image record in accordance with the preferred embodiments. In particular, the process starts at block 10 and proceeds to the step of acquiring an image (step 12). Acquiring an image may be as simple as scanning a medical form, or may be as complex as running a CT scan or a MRI scan. After the image is acquired, it is preferably combined with other parameters to form an image record (step 14). The type of parameters combined with the image may vary dramatically, depending on the application. If the image is merely a scanned medical form, for example, then possibly only a date and time may be required. On the other hand, if the image is an x-ray, other information like the patient's name, the orientation or view depicted, the particular machine that took the image, the machine operator's name, the date and time, and the like, may be combined with the image. After combination with pertinent parameters, preferably the acquiring machine creates a digital signature of the image record (step 16). As discussed above, the creation of a digital signature preferably involves enciphering the hash of the file to be "signed." In the context of creating a digital signature by the acquiring machine, this digital signature is preferably created by enciphering, with the acquiring machine's private key, the image in combination with the other parameters.

The next step in the preferred process is the operator of the acquiring machine providing biometric information (step 18). The biometric information may be an entire biometric file, such as the entire image of a fingerprint or iris scan, but preferably is a minutiae sufficient to identify the operator. The biometric information is preferably combined with the image record so that the image record itself identifies the operator of the machine. While the steps of FIG. 1 show that the acquiring machine creates a digital signature prior to the operator providing a biometric, these steps may be reversed without a departure from the scope and spirit of the invention. Finally, the machine operator signs the image record (including the biometric provided by the machine operator) by creation of a digital signature (step 20). The digital signature created by the machine operator is also preferably combined in the image record so that anyone viewing the record can verify the machine operator's signature by deciphering that signature using the machine operator's public key. Finally, the process of acquiring the image ends at step 22.

Acquiring an image using the steps as shown in FIG. 1 creates an audit trail with respect to the particular image. Verification that a particular acquiring machine was used may be had by stripping away the later appended material (in the embodiment depicted by FIG. 1 the machine operator's biometric record and digital signature) and verifying the acquiring machine's digital signature using its public key. With respect to the machine operator, both the biometric information of the operator, as well as the digital signature, may be used to verify and track that the machine operator was in some fashion responsible for and viewed the information in the image.

For the next portion of the discussion of the preferred embodiments, assume that a completed image record has been created as generally described in the steps of FIG. 1. Preferably, this image record is stored in a central database, for example on a mass storage device of a computer system, and persons needing access to the information preferably retrieve the information from the central database. FIG. 2 shows a flow diagram of the preferred steps for a requestor to access the information of the image record, while also securing access to the image record and providing an audit trail of those who have accessed the information.

The process starts (block 24) and proceeds immediately to a requestor requesting a copy of the image record (step 26). As part of the request, the requestor preferably provides a biometric. This biometric may comprise any physiological attribute which uniquely identifies the requester, such as a fingerprint, an iris scan, a voice sample, a DNA sample, or the like. In the system of the preferred embodiments, verification of the requestor identification (step 30) is made by comparison of the biometric provided, or a minutiae thereof, to a set of biometrics previously supplied and verified. While biometric data is preferably used to verify the identity of the requester, any mechanism may be used such as an exchange using a message enciphered with the private key of the requester. If the requestor is not authorized to view the image record (step 32), the request is simply rejected (step 34), and the process ends (step 44). If, however, the requestor's identity is verified, the biometric provided is combined with the image (step 36). As will be discussed more thoroughly below, the method of combining the biometric information with the image may take many forms, for example, simply appending the biometric information to the file, or by steganographic techniques, whereby the biometric information is hidden within the viewable area of the image. Regardless of the particular mechanism used to combine the biometric with the image, preferably thereafter the requester creates a digital signature using the image created at step 36 and the requestor's private key (step 38). While FIG. 2 indicates that the requestor's digital signature is based in part on the biometric previously provided by the requester, it is within the contemplation of this invention that the requestor's signature could be based on the image without the biometric.

After combination of the biometric information with the image and other parameters, and the creation of the digital signature of the requester, preferably the digital signature is combined along with the image record and the biometric information to make a new overall or expanded image record that contains the information (step 40). Thereafter, the requester is provided the overall image record (step 42). Finally, the process ends at step 44.

Referring generally to FIGS. 1 and 2, it is seen that in the exemplary system described, that an original image becomes an image record which contains verifiable audit trails of the machine that created the image, and the machine operator. A requestor's information is combined with the remaining information such that that requester too may be identified as having had access to the record merely by reference to the expanded image record. If any verification is required, this may be accomplished by a combination of biometric information and/or use of public keys for the machine, the machine operator, or the requestor.

Referring now to FIGS. 3A-C, there is shown in a graphical form, operation of the preferred embodiments. In particular, FIG. 3A exemplifies an image 46 combined with parameters 48 pertinent to the image. As discussed above, this image may be as simple as the scanned version of a document, or a single frame x-ray, or may be as complicated as a frame in a series of frames of a three-dimensional image such as a CT scan or MRI. FIG. 3B shows, again in graphical form, how the biometric of the machine operator 50 may be combined with the image 46 and parameters 48. In FIG. 3B, this is exemplified by having the biometric material wrapped around an outer edge of the image parameters; however, any combination is within the contemplation of this invention. The biometric data may be simply added to the beginning or appended to the end of the image, or embedded within the image through the use of steganographic techniques. FIG. 3B also shows that the digital signature 52 of the operator is preferably combined with the file as well. Thus, the combination of the image 46, the parameters 48, the biometric 50, and the digital signature 52 represent an image record 54, which is preferably stored in a central database facility. At some point thereafter, and preferably following the steps outlined in FIG. 2, a requestor may seek access to the information. This access may be, for example, a doctor wishing to review the results of an x-ray, or an administrator looking to file a claim with an insurance company based on information stored in the image record. Regardless of who seeks access, in the preferred embodiments, the person seeking access preferably provides a biometric 56 and a digital signature 58, which are combined with the remaining portions of the record, and thus become a part of the record, as graphically shown in FIG. 3C. In one embodiment, this process continues for each person seeking access to the record. Thus, if twenty people seek and obtain access to the image record, the record, after access by the last person, contains twenty-one biometrics (one for each requester, and the machine operator), and correspondingly twenty-two digital signatures (one for each requester, one for the machine operator, and one for the acquiring machine). In this first embodiment, verification of access by a particular requesters may be made by checking the included biometric for the particular requestor existing within the file. If the image record resolution remains unchanged after combination with the biometrics and digital signatures (where the biometrics and signatures are simply added to file, rather than embedded in the file using techniques such as steganography), it is further possible to recreate the image file as it existed at any point (by stripping away subsequent additions) and verify the digital signature of any requestor. Each image record is preferably stored at a central location, thus enabling the preferred method of appending biometric and digital signatures of requestors to the file prior to sending that information to the requestors. If a particular requester leaks the information or it is otherwise given to someone who is not allowed to have access, the last person identified in the record, verifiable by the biometric as well as the digital signature, would be closest to the person responsible for the loss of control of the information.

In a second embodiment, the image record is maintained at the central location as it was originally created. As each requestor is granted access, their biometric information is combined with the image record and sent to the requestor; however, the original remains unchanged. Access tracking in such a system is maintained by a "back-end" database that tracks requesters, including their biometric information and digital signature of the combined image record and biometric. If the combined image is leaked by the requester, the included biometric is indicative of the source.

Throughout the specification the use of steganographic techniques are discussed. There are many forms of steganography which may be used in conjunction with the embodiments described. For more information regarding steganography and steganographic techniques, reference may be had to: "Information Hiding Techniques for Steganography and Digital Watermarking" by Stefan Katzenbeisser (Editor), Fabien, A. P. Petitcolas (Editor) (which is incorporated by reference as if reproduced in full below); "Disappearing Cryptography, Second Edition—Information Hiding: Steganography and Watermarking," by Peter Wayner (which is incorporated by reference herein as if reproduced in full below); and "Information Hiding: Steganography and Watermarking—Attacks and Countermeasures (Advances in Information Security, Volume 1)," by Neil F. Johnson, Zoran Duric, and Sushil G. Jajodia (which is incorporated by reference as if reproduced in full below). The embodiments described herein envision that not only steganographic techniques are used, but that the biometric information may be hidden within image records "out of band"—for example where the biometric is exclusively assigned a color within the image. In this way, the biometric may be visible through the use of a specially colored lens. Moreover, in this system if the digital record is printed, the printed version may likewise disclose the biometric through the use of the specially colored lens. Alternatively in the printing realm, the biometric may be exclusively assigned a special ink that becomes visible only upon illumination by a ultra-violet light or light having a particular polarization.

The discussion to this point has been primarily directed to single image records such as scanned images, pictures, x-rays, and the like. However, the preferred embodiments of the present invention are equally applicable to streaming-type digital information such as digital audio video. Application of the embodiments described with respect to FIGS. 1-3 to the streaming video case preferably takes place on a frame-byframe basis. That is, if a series of information is made up of ten video frames, preferably the biometric and digital signature information is combined with those frames on an image-by-image basis. If the requester views only the first three frames, the biometric and digital signature are only applied to those three frames. In this way, not only is it possible to verify that a particular person has had access to the images, but it is also possible to track the extent the person viewed the record. If the streaming source is audio, it is contemplated that small increments of the audio file, such as five second increments, may have combined therewith biometric information of those who have been granted access.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of creating audit trails regarding access to digital information comprising:
    providing a biometric of a person seeking access to the digital information;
    creating a digital signature by the person seeking access based on the digital information and the person's private key; and
    combining the biometric and the digital signature with the digital information.

2. The method as defined in claim 1 wherein the digital information is a streaming source, and wherein the creating and combining steps take place on an incremental basis within the streaming source.

3. The method as defined in claim 2 wherein the digital information is digital video, and wherein the creating and combining steps take place on a frame-by-frame basis.

4. The method as defined in claim 1 wherein creating a digital signature by the person seeking access based on the digital information further comprises:
    calculating a one-way hash of the digital information to create a resultant; and
    enciphering the resultant with a private key of the person seeking access to the digital information.

5. The method as defined in claim 4 wherein the calculating the one-way hash step further comprises calculating the one-way hash of the combination of the biometric and the digital information.

6. The method as defined in claim 1 wherein combining the biometric and the digital signature with the digital information further comprises:
    including the biometric with the digital information; and
    including the digital signature with the digital information.

7. The method as defined in claim 6 wherein the including steps further comprises appending the biometric and digital signature to the digital information.

8. The method as defined in claim 1 wherein combining the biometric and the digital signature with the digital information further comprises combining the biometric within the digital information using steganographic techniques.

9. The method as defined in claim 8 wherein combining the biometric within the digital information using steganographic techniques further comprises assigning an exclusive state for the biometric information.

10. The method as defined in claim 9 wherein assigning an exclusive state for the biometric information further comprises assigning an out-of-band color for the biometric.

11. The method as defined in claim 8 further comprising including the digital signature with the digital information.

12. The method as defined in claim 1 wherein providing a biometric of a person seeking access to the digital information further comprises providing fingerprint information of the person seeking access to the digital information.

13. The method as defined in claim 1 wherein providing biometric information of a person seeking access to the digital information further comprises providing iris scan information of the person seeking access to the digital information.

14. The method as defined in claim 1 wherein providing biometric information of a person seeking access to the digital information further comprises providing voice sample information of the person seeking access to the digital information.

15. A method comprising:
    acquiring a digital image;
    creating a digital signature by an acquiring machine operator based at least in part on the digital image; and
    combining the digital image, a biometric of the acquiring machine operator, and the digital signature of the acquiring machine operator to create an image record.

16. The method as defined in claim 15 further comprising:
    requesting access to the image record by a requestor;
    verifying the requestor's right to access the image record;
    creating a digital signature of the requestor based at least in part on the image record;
    combining the image record, a biometric of the requestor, and the digital signature of the requestor to create an expanded image record; and
    providing the expanded image record to the requestors.

17. The method as defined in claim 16 wherein creating a digital signature by an acquiring machine operator based at least in part on the digital image further comprises enciphering a one-way hash of the digital image using the a private key of the acquiring machine operator.

18. The method as defined in claim 16 wherein combining the digital image, a biometric of the acquiring machine operator, and the digital signature of the acquiring machine operator to create an image record further comprises:
    appending the biometric of the acquiring machine operator to the digital image; and
    appending the digital signature of the acquiring machine operator to the digital image.

19. The method as defined in claim 16 wherein combining the digital image, a biometric of the acquiring machine operator, and the digital signature of the acquiring machine operator further comprises integrating the biometric within the digital image using steganographic techniques.

20. The method as defined in claim 19 further comprising integrating the digital signature of the machine operator into the digital image using steganographic techniques.

21. The method as defined in claim 16 wherein verifying the Requestor's right to access the image record further comprises:
    supplying a biometric of the requestor;
    comparing the biometric supplied by the requestor to a previously verified biometric of the requestor; and
    allowing the requestor to obtain the expanded image record if the biometric supplied by the requestor matches the previously verified biometric of the requestor.

22. The method as defined in claim 16 wherein creating a digital signature of the requestor based at least in part on the image record further comprises creating a digital signature by the requestor of a combined image record and biometric of the requestor.

23. The method as defined in claim 16 wherein combining the image record, a biometric of the requestor, and the digital signature of the requestor to create an expanded image record further comprises:
   appending the biometric of the requestor to the image record; and
   appending the digital signature of the requestor to the image record.

24. The method as defined in claim 16 wherein combining the image record, a biometric of the requestor, and the digital signature of the requestor to create an expanded image record further comprises integrating the biometric of the requestor within the image record using steganographic techniques.

25. The method as defined in claim 16 further comprising integrating the digital signature of the of the requestor into the digital image using steganographic techniques.

26. The method as defined in claim 16 further comprising:
   creating a digital signature by the acquiring machine based at least in part on the digital image; and
   wherein the combining step further comprises combining the digital image, the digital signature by the acquiring machine, the biometric of the acquiring machine operator, and the digital signature of the acquiring machine operator to create the image record.

27. The method as defined in claim 16 wherein acquiring a digital image further comprises scanning a document to create the digital image.

28. The method as defined in claim 16 wherein acquiring a digital image further comprises taking an x-ray to create the digital image.

29. The method as defined in claim 16 wherein acquiring a digital image further comprises taking a magnetic resonance image (MRI) scan to create the digital image, and wherein the creating and combining steps take place on a frame-by-frame basis.

30. The method as defined in claim 16 wherein acquiring a digital image further comprises taking CT scan to create the digital image, and wherein the creating and combining steps take place on a frame-by-frame basis.

31. A method of creating audit trails regarding access to a digital medical record comprising:
   providing a biometric of a person seeking access to the digital medical record;
   creating a digital signature by the person seeking access based on the digital medical record and the private key of the person seeking access; and
   combining the biometric and the digital signature with the digital medical record.

32. The method as defined in claim 31 wherein creating a digital signature by the person seeking access based on the digital medical record further comprises:
   calculating a one-way hash of the digital medical record to create a resultant; and
   enciphering the resultant with a private key of the person seeking access to the digital medical record.

33. The method as defined in claim 32 wherein the calculating the one-way hash step further comprises calculating the one-way hash of the combination of the biometric and the digital medical record.

34. The method as defined in claim 31 wherein combining the biometric and the digital signature with the digital medical record further comprises:
   including the biometric with the digital medical record; and
   including the digital signature with the digital medical record.

35. The method as defined in claim 34 wherein the including steps further comprise appending the biometric and digital signature to the digital medical record.

36. The method as defined in claim 31 wherein combining the biometric and the digital signature with the digital medical record further comprises combining the biometric within the digital medical record using steganographic techniques.

37. The method as defined in claim 36 further comprising including the digital signature with the digital medical record.

38. The method as defined in claim 31 wherein providing a biometric of a person seeking access to the digital medical record further comprises providing fingerprint information of the person seeking access to the digital medical record.

39. The method as defined in claim 31 wherein providing biometric information of a person seeking access to the digital medical record further comprises providing iris scan information of the person seeking access to the digital medical record.

40. The method as defined in claim 31 wherein providing biometric information of a person seeking access to the digital medical record further comprises providing voice sample information of the person seeking access to the digital medical record.

41. A computer-readable medium storing a program that, when executed by a processor, causes the processor to:
   receive a biometric of a person seeking access to digital information;
   create a digital signature by the person seeking access based on the digital information and the person's private key; and
   combine the biometric and the digital signature with the digital information.

42. The computer-readable medium as defined in claim 41 wherein when the processor creates and combines, the program further causes the processor to create and combine on an incremental basis on the digital information in the form of a streaming source.

43. The computer-readable medium as defined in claim 42 wherein when the processor creates and combines, the program causes the processor to create and combine on a frame-by-frame basis on the digital information in the form of a digital video.

44. The computer-readable medium as defined in claim 41 wherein when the processor creates, the program further causes the processor to:
   calculate a one-way hash of the digital information to create a resultant; and
   encipher the resultant with a private key of the person seeking access to the digital information.

45. The computer-readable medium as defined in claim 44 wherein when the processor calculates the one-way hash, the program further causes the processor to calculate the one-way hash of the combination of the biometric and the digital information.

46. The computer-readable medium as defined in claim 41 wherein when the processor combines, the program further causes the processor to:
   include the biometric with the digital information; and
   include the digital signature with the digital information.

47. The computer-readable medium as defined in claim 46 wherein when the program further causes the processor to append the biometric and digital signature to the digital information.

48. The computer-readable medium as defined in claim 41 wherein when the processor combines, the program further causes the processor to combine the biometric within the digital information using steganographic techniques.

49. The computer-readable medium as defined in claim 48 wherein when the processor combines the biometric within the digital information, the program further causes the processor to assign an exclusive state for the biometric information.

50. The computer-readable medium as defined in claim 49 wherein when the processor assigns, the program further causes the processor to assign an out-of-band color for the biometric.

51. The computer-readable medium as defined in claim 49 wherein the program further causes the processor to include the digital signature with the digital information.

52. The computer-readable medium as defined in claim 41 wherein when the processor receives, the program further causes the processor to receive fingerprint information of the person seeking access to the digital information.

53. The computer-readable medium as defined in claim 41 wherein when the processor receives, the program further causes the processor to receive an iris scan information of the person seeking access to the digital information.

54. The computer-readable medium as defined in claim 41 wherein when the processor receives, the program further causes the processor to receive a voice sample information of the person seeking access to the digital information.

* * * * *

UNITED STATES PATENT AND TRADEMARK OFFICE
CERTIFICATE OF CORRECTION

PATENT NO.         : 7,472,283 B2                                          Page 1 of 1
APPLICATION NO. : 10/158359
DATED              : December 30, 2008
INVENTOR(S)        : Michael F. Angelo et al.

It is certified that error appears in the above-identified patent and that said Letters Patent is hereby corrected as shown below:

In column 10, line 35, in Claim 17, delete "the a" and insert -- the --, therefor.

In column 10, line 54, in Claim 21, delete "Requestor's" and insert -- requestor's --, therefor.

In column 11, line 15, in Claim 25, after "signature" delete "of the".

Signed and Sealed this

Twenty-first Day of April, 2009

JOHN DOLL
*Acting Director of the United States Patent and Trademark Office*